J. HOFMANN.
OPERATING MECHANISM FOR CHURNS.
APPLICATION FILED NOV. 11, 1915.
1,227,267. Patented May 22, 1917.
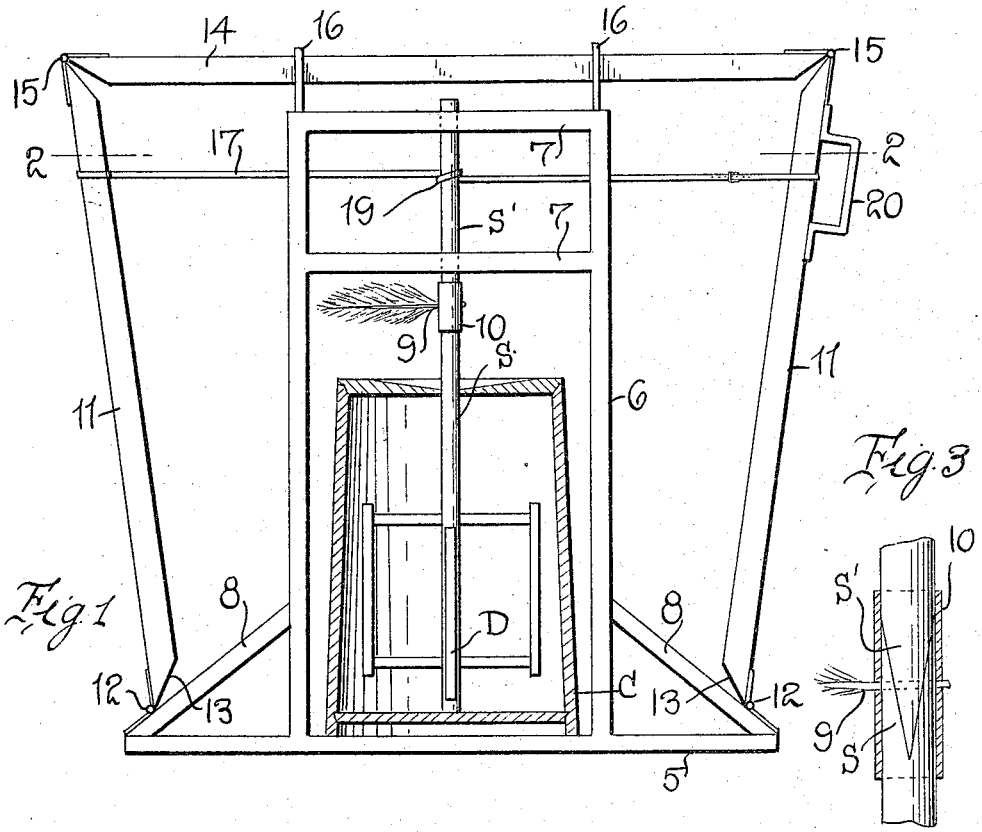
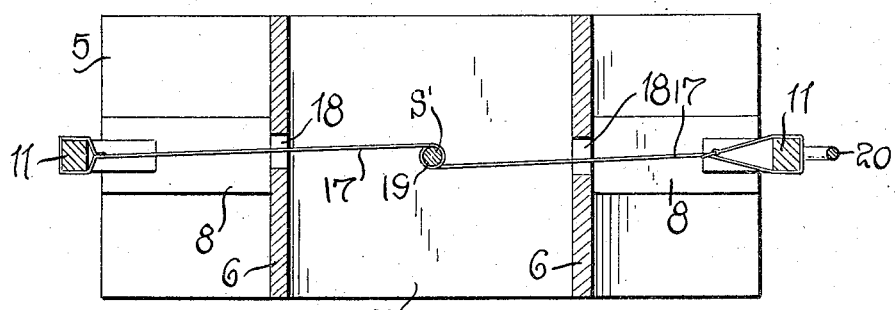
Inventor
J. HOFMANN
By Watson E. Coleman
Attorney

UNITED STATES PATENT OFFICE.

JOHN HOFMANN, OF BEE BRANCH, ARKANSAS.

OPERATING MECHANISM FOR CHURNS.

1,227,267.  Specification of Letters Patent.  Patented May 22, 1917.

Application filed November 11, 1915. Serial No. 60,936.

*To all whom it may concern:*

Be it known that I, JOHN HOFMANN, a citizen of the United States, residing at Bee Branch, in the county of Van Buren and State of Arkansas, have invented certain new and useful Improvements in Operating Mechanisms for Churns, of which the following is a specification, reference being had to the accompanying drawings.

This invention relates to an improved churn and has for its primary object to provide a very simple and easily operated mechanism for actuating the dasher, whereby milk and cream may be quickly churned into butter with a minimum of manual labor.

It is another object of the invention to provide a device of the above character which is strong and durable in its construction and not liable to get out of order, the device as a whole consisting of very few parts so that the invention may be produced at relatively small manufacturing cost.

With the above and other objects in view, my invention consists in the novel features of construction, combination and arrangement of parts to be hereinafter more fully described, claimed and illustrated in the accompanying drawing, in which, Figure 1 is a side elevation of my invention, the churn body being shown in section;

Fig. 2 is a section taken on the line 2—2 of Fig. 1; and

Fig. 3 is a detail sectional view through the coupling sleeve, whereby the shaft sections are detachably connected together.

Referring in detail to the drawing, 5 designates a suitable base or platform upon which the spaced vertical uprights 6 are suitably secured. The upper ends of these uprights are connected together by the spaced parallel horizontal bars 7. 8 indicates diagonal braces which are fixed to the uprights 6 adjacent their lower ends and to the platform 5.

C indicates the churn body which is adapted to be arranged upon the platform 5 between the uprights 6, and in this body the dasher D is rotatably mounted. This dasher may be of any ordinary or approved construction but preferably consists of a plurality of rectangular diametrically opposed vertical bars which are connected to the dasher shaft S by means of radial spokes or arms. An operating shaft S' is mounted in central openings provided in the horizontal bars 7 of the frame, and when the churn is arranged in position upon the base 5, the dasher shaft S is in axial alinement with this operating shaft. The lower end of the operating shaft is inclined or beveled on opposite sides to a point, as indicated at $s'$ in Fig. 3, and the upper end of the dasher shaft S has a correspondingly shaped kerf $s$ formed therein to receive the pointed end of the operating shaft. These engaged ends of the shafts S and S' are provided with openings adapted to coincide with each other to receive a pin 9 which is adapted to be inserted through said openings and through diametrically opposed openings in a coupling sleeve 10 which is engaged over the two shafts at the connection thereof. I preferably utilize a feather plucked from the body of a fowl and engage the stem thereof through the coupling sleeve and the two shaft sections. This feather being disposed immediately above the churn, will create an air current to ward off flies or insects during the operation of the device.

Upon the outer ends of the inclined braces 8, the lower ends of the bars 11 are hinged, as indicated at 12. The ends of these bars which are opposed to the braces 8 are beveled or inclined, as at 13, so as to permit of the inward swinging movement of the bars. The upper ends of the bars 11 are similarly beveled or inclined and, to the same, the opposite ends of a horizontal bar 14 are hingedly connected, as at 15. This horizontal bar reciprocates through spaced upstanding guide loops 16 fixed in the ends of the upper horizontal bars 7 of the frame.

A strap or thong 17 is suitably fixed at one of its ends to one of the bars 11 and extends through openings 18 in the upper ends of the frame uprights 6. This strap is turned once around the medial portion of the operating shaft S', as shown at 19, and the other end of the strap is connected to the other of the hinged bars 11. This bar is provided with a suitable hand loop 20, whereby the same may be conveniently actuated.

In the operation of the mechanism, assuming that the churn body has been supplied with cream and milk and the top thereof closed, the hand hold 20 is grasped and the bar 11 moved rapidly back and forth toward and from the churn. Such movement is also transmitted to the other of the bars 11 through the medium of the horizontal connecting bar 14, and the hinge connections between these bars and of the bars 11 to the braces 8 permit of a sufficient extent of movement of said bars so that the thong or strap 17 which is turned about the operating shaft S′ will impart a very rapid rotative movement to said shaft alternately in opposite directions, and as this shaft is coupled to the dasher shaft in the manner above explained, the dasher D is also rapidly rotated first in one direction and then in the other within the body of the churn so that the contents thereof are agitated or churned. After the churning operation has been completed and the contents of the churn converted into butter, the spline of the feather is withdrawn from the coupling sleeve 10 and the ends of the shafts S and S′ so that said sleeve may be slipped downwardly upon the dasher shaft and the churn, together with the dasher, removed from the frame. It is, of course, understood that the number of revolutions imparted to the dasher shaft in the movement of the operating bar 11 in each direction will be determined by the diameter of the operating shaft S′. I have found my improved churn operating mechanism to be extremely efficient and reliable in practical use and capable of churning a large quantity of milk and cream into butter in a relatively short length of time. The frame structure upon which the churn and operating parts are mounted may be, of course, considerably varied from that disclosed in the accompanying drawing. The invention is also susceptible of a great many modifications in the form, proportion and arrangement of the several elements and I, therefore, reserve the privilege of adopting all such legitimate changes as may be fairly embodied within the spirit and scope of the invention as claimed.

Having thus fully described my invention, what I desire to claim and secure by Letters Patent is:—

The combination with a frame including a base, spaced vertical uprights and diagonal braces between the uprights and the base, of an operating shaft rotatably mounted in said frame, vertical bars hingedly mounted upon the braces for oscillating movement and having beveled ends opposed to the braces, a hand grasp carried by the outer face of one of the vertical bars below the upper end thereof, a horizontal bar hingedly connected to the upper ends of the vertical oscillatory bars, spaced guide loops fixed in the frame through which said horizontal bar is adapted to reciprocate, a flexible operating member connected at its ends to said oscillatory bars and movable through openings in the uprights, said flexible member having a single turn therein engaged upon the operating shaft, and means for coupling said operating shaft to a dasher shaft.

In testimony whereof I hereunto affix my signature in the presence of two witnesses.

JOHN HOFMANN.

Witnesses:
L. G. MONTGOMERY,
J. R. PATTERSON.

Copies of this patent may be obtained for five cents each, by addressing the "Commissioner of Patents, Washington, D. C."